US009130777B2

(12) United States Patent
Gonda et al.

(10) Patent No.: US 9,130,777 B2
(45) Date of Patent: Sep. 8, 2015

(54) METHODS AND SYSTEMS FOR USING A VAULT SERVER IN CONJUNCTION WITH A CLIENT-SIDE RESTRICTED-EXECUTION VAULT-MAIL ENVIRONMENT

(75) Inventors: Oded Gonda, Tel Aviv (IL); Ofer Raz, Ramat Gan (IL); Alon Kantor, Tel Aviv (IL); Uri Bialik, Ramat Efal (IL); Yoav Kirsch, Macabim (IL)

(73) Assignee: Check Point Software Technologies, LTD., Tel Aviv (IL)

( * ) Notice: Subject to any disclaimer, the term of this patent is extended or adjusted under 35 U.S.C. 154(b) by 1227 days.

(21) Appl. No.: 12/273,567

(22) Filed: Nov. 19, 2008

(65) Prior Publication Data
US 2010/0125637 A1 May 20, 2010

(51) Int. Cl.
*H04L 12/58* (2006.01)
*G06Q 10/10* (2012.01)
*H04L 29/06* (2006.01)

(52) U.S. Cl.
CPC ............ *H04L 12/583* (2013.01); *G06Q 10/107* (2013.01); *H04L 51/063* (2013.01); *H04L 51/12* (2013.01); *H04L 51/34* (2013.01); *H04L 63/20* (2013.01); *H04L 63/08* (2013.01)

(58) Field of Classification Search
CPC ..... H04L 12/5885; H04L 51/34; H04L 51/12; G06Q 10/107
USPC ........................................................ 709/206
See application file for complete search history.

(56) References Cited

U.S. PATENT DOCUMENTS

| 6,230,186 | B1 * | 5/2001 | Yaker ............................ 709/206 |
| 6,360,254 | B1 * | 3/2002 | Linden et al. ................. 709/219 |
| 6,721,784 | B1 | 4/2004 | Leonard et al. |
| 7,640,322 | B2 * | 12/2009 | Wendkos et al. ............. 709/219 |
| 7,694,328 | B2 | 4/2010 | Joshi |
| 7,832,012 | B2 | 11/2010 | Huddleston |
| 7,861,096 | B2 * | 12/2010 | Staddon et al. ................ 713/193 |
| 2002/0129275 | A1 * | 9/2002 | Decuir .......................... 713/201 |
| 2003/0233410 | A1 * | 12/2003 | Gusler et al. .................. 709/206 |
| 2006/0075228 | A1 * | 4/2006 | Black et al. .................... 713/167 |
| 2006/0167709 | A1 * | 7/2006 | Jung et al. .......................... 705/1 |
| 2007/0005717 | A1 * | 1/2007 | LeVasseur et al. ............ 709/206 |
| 2007/0011259 | A1 | 1/2007 | McNulty |
| 2007/0067402 | A1 * | 3/2007 | Sugii et al. ..................... 709/206 |
| 2008/0228867 | A1 * | 9/2008 | Murphy et al. ................ 709/203 |
| 2008/0288597 | A1 * | 11/2008 | Christensen et al. ......... 709/206 |
| 2009/0031393 | A1 * | 1/2009 | Denner et al. .................... 726/1 |

* cited by examiner

*Primary Examiner* — Blake Rubin
(74) *Attorney, Agent, or Firm* — Mark M. Friedman

(57) ABSTRACT

Disclosed are methods, media, and vault servers for providing a secure messaging system using vault servers in conjunction with client-side restricted-execution vault-mail environments. Methods include the steps of upon activating a vault-mail message containing sensitive content, removing the content from the vault-mail message; placing the content on a vault server; creating a link in the vault-mail message to the content on the vault server; sending the vault-mail message to a designated recipient; and upon activating the link, allowing the content to be only viewed in a restricted-execution session of a client application, wherein the restricted-execution session does not allow the content to be altered, copied, stored, printed, forwarded, or otherwise executed. Preferably, the activation of the vault-mail message is performed by a network-security gateway, and can be performed on a per-message basis. Preferably, the activation of the link requires user authentication which may be designated during activation of the vault-mail message on a per-message basis based on said content. Preferably, the restricted-execution session enforces a security policy.

27 Claims, 2 Drawing Sheets

METHODS AND SYSTEMS FOR USING A VAULT SERVER IN CONJUNCTION WITH A CLIENT-SIDE RESTRICTED-EXECUTION VAULT-MAIL ENVIRONMENT

FIELD AND BACKGROUND OF THE INVENTION

The present invention relates to methods and systems for providing a secure e-mail messaging system using a vault server in conjunction with a client-side restricted-execution vault-mail environment.

The advent of e-mail has greatly expanded and enhanced traditional communication channels. The ability to attach documents to e-mail messages has provided users an easy way to share information. However, with the ubiquitous use of e-mail communication, there has been an increasing concern over the security of such information. Besides the lack of control over second-hand distribution, e-mail content and attachments may be accessed by unauthorized individuals who are familiar with various methods of "hacking" into so-called "secure" information systems and gateways.

In the prior art, solutions exist for solving the authenticity and integrity issues in the email protocol (e.g. S/MIME, SMTPS, and PGP). These solutions are often difficult to implement as they require advanced configuration from the users. In addition, these solutions do not solve the issue of controlling content distribution.

Other solutions exist for ensuring that files cannot be opened by unauthorized users. Enterprise digital rights-management (DRM) systems, such as Microsoft's Office Information Rights Management package, can restrict specific type of documents from being opened by unauthorized individuals. Enterprise DRM systems typically require protected files to be changed, limiting system support to select file types and versions.

Other secure-messaging solutions employ a similar approach, also referred to as a "vault" in the industry. As a prior-art example, McNulty, in US Patent Publication No. 20070011259 (hereinafter referred to as McNulty '259), discloses a secure messaging and data transaction system and method. However, in McNulty '259, a protected message is rendered (i.e. displayed) on the vault server itself, which means that the message's external presentation needs to be converted into a web format. This prevents the use of typical desktop applications for accessing such a message. Furthermore, the message's recipient can copy (e.g. "cut and paste"), print, and/or save the message's content at will. The Secure Vault from Secure Data in Motion, Inc., dba Sigaba, San Mateo, Calif., provides a similar solution to McNulty '259.

Joshi et al., in US Patent Publication No. 20050149726 (hereinafter referred to as Joshi '726) discloses systems and methods for secure client applications. Joshi '726 describes the use of a restricted execution environment to handle files (e.g. e-mail attachments) received from an external source. However, the disclosure of Joshi '726 is aimed at protecting the client (i.e. the recipient) and, as such, does not provide the sender with any protection (e.g. by preventing the client from copying or forwarding the message). Huddleston, in US Patent Publication No. 20050273856 (hereinafter referred to as Huddleston '856), discloses a method and system for isolating suspicious email using a similar approach.

Leonard et al. in U.S. Pat. No. 6,721,784 (hereinafter referred to as Leonard '784), teaches a system and method for enabling the originator of an electronic mail message to preset an expiration time, date, and/or event, and to control and track processing or handling by all recipients. However, the invention of Leonard '784 requires a special "viewer" application to run on the recipient's computer, which restricts the types of files that can be sent to a few well-known types.

It would be desirable to have methods and systems for providing a secure e-mail messaging system using a vault server in conjunction with a client-side restricted-execution vault-mail environment. Such methods would, inter alia, overcome the limitations of the prior art as described above.

SUMMARY OF THE INVENTION

It is the purpose of the present invention to provide methods and systems for providing a secure e-mail messaging system using a vault server in conjunction with a client-side restricted-execution vault-mail environment.

For the purpose of clarity, several terms are defined herein. The terms "e-mail vault" and "vault server" are used herein to refer to a server that provides a restricted-execution e-mail environment. This is in contrast to the use of the term "e-mail vault" for referring to e-mail archiving solutions, or for denoting binary data in DRM containers (e.g. an encrypted and authenticated representation of a sum of money). The term "vault-mail environment" is used herein to refer to a secure environment in which content can be exchanged with a vault server. The term "restricted-execution session" is used herein to refer to a computing session running on a client application which allows a user to view sensitive content residing on a vault server in a way that does not permit altering, copying, permanently storing, printing, forwarding, or otherwise duplicating the content in any way.

Preferred embodiments of the "vault-mail" solution of the present invention differ from the prior art, inter alia, in that the vault server does not modify the protected files, allowing the solution to support any kind of file type and version. In the vault-mail solution, all rendering occurs securely on the recipient's computer. The vault-mail solution can use any desktop application with no technical limitations (as long as it is permitted access by the application's security settings). Furthermore, the vault-mail solution limits operations on the content (e.g. copying, printing, saving, and forwarding) via a client-side restricted-execution e-mail environment.

Preferred embodiments of the present invention teach methods for addressing two issues that are not handled well in the standard e-mail protocol.

(1) The content of e-mail is sent "unguarded", meaning that e-mail communication is susceptible to eavesdropping, questions of authenticity, and concerns over integrity.

(2) Once an e-mail message arrives at its destination, the sender of the e-mail no longer controls the distribution of the content; the recipient can redistribute the e-mail's content without any limitations.

In preferred embodiments of the present invention, instead of sending sensitive content in an e-mail message, the sensitive content is stored in a trusted server (i.e. the e-mail vault). A link to the sensitive content is placed in the body of a vault-mail message. When the recipient clicks on the link inside the vault-mail message, he/she can view the sensitive content only after performing a login procedure that authenticates the recipient. The recipient can view the sensitive content that was placed in the e-mail vault in a way that does not permit altering, copying, storing, and/or forwarding the content in any way.

Therefore, according to the present invention, there is provided for the first time a method for using a vault server in conjunction with a client-side restricted-execution vault-mail environment, the method including the steps of: (a) upon activating a vault-mail message containing sensitive content, removing the content from the vault-mail message; (b) placing the content on a vault server; (c) creating a link in the vault-mail message to the content on the vault server; (d) sending the vault-mail message to a designated recipient; and (e) upon activating the link, allowing the content to be only viewed in a restricted-execution session of a client application, wherein the restricted-execution session does not allow the content to be altered, copied, stored, printed, forwarded, or otherwise executed.

Preferably, the activation of the vault-mail message is performed by a network-security gateway.

Preferably, the activation of the vault-mail message can be performed on a per-message basis.

Preferably, the activation of the link requires user authentication.

Most preferably, the user authentication may be designated during activation of the vault-mail message on a per-message basis based on said content.

Preferably, the restricted-execution session enforces a security policy, wherein the security policy designates which user applications are allowed to run in the restricted-execution session.

According to the present invention, there is provided for the first time a computer-readable storage medium having computer-readable code embodied on the computer-readable storage medium, the computer-readable code including: (a) program code for, upon activating a vault-mail message containing sensitive content, removing the content from the vault-mail message; (b) program code for placing the content on a vault server; (c) program code for creating a link in the vault-mail message to the content on the vault server; (d) program code for sending the vault-mail message to a designated recipient; and (e) program code for, upon activating the link, allowing the content to be only viewed in a restricted-execution session of a client application, wherein the restricted-execution session does not allow the content to be altered, copied, stored, printed, forwarded, or otherwise executed.

Preferably, the activation of the vault-mail message is performed by a to network-security gateway.

Preferably, the activation of the vault-mail message can be performed on a per-message basis.

Preferably, the activation of the link requires user authentication.

Most preferably, the user authentication may be designated during activation of the vault-mail message on a per-message basis based on said content.

Preferably, the restricted-execution session enforces a security policy, wherein the security policy designates which user applications are allowed to run in the restricted-execution session.

Preferably, the computer-readable code further including: (f) program code for, prior to the step of allowing, performing a compliance check, by the client application, on a client system to verify that the client system does not contain a virus, the step of performing being optionally operative on a per-message basis based on the content.

Preferably, the computer-readable code further including: (f) program code for, prior to the step of allowing, triggering a restricted-operation mode, by the client application, on a client system during the restricted-execution session, the step of triggering being optionally operative on a per-message basis based on the content.

Preferably, the computer-readable code further includes: (f) program code for, prior to the step of allowing, adding a watermark to the content, by the client application, wherein the watermark can be used to identify a content source of the content in case of a content leak, the step of adding being optionally operative on a per-message basis based on the content.

According to the present invention, there is provided for the first time a vault server for enabling a client-side restricted-execution vault-mail environment, the vault server including: (a) a memory for storing program code, wherein the program code includes program code for: (i) upon activating a vault-mail message residing in a client system containing sensitive content, removing the content from the vault-mail message; (ii) placing the content on the vault server; (iii) creating a link in the vault-mail message to the content on the vault server; (iv) sending the vault-mail message to a designated recipient; and (v) upon activating the link, allowing the content to be only viewed in a restricted-execution session of a client application, wherein the restricted-execution session does not allow the content to be altered, copied, stored, printed, forwarded, or otherwise executed; and (b) a processor for executing the program code.

Preferably, the activation of the vault-mail message is performed by a network-security gateway.

Preferably, the activation of the vault-mail message can be performed on a per-message basis.

Preferably, the activation of the link requires user authentication.

Most preferably, the user authentication may be designated during activation of the vault-mail message on a per-message basis based on said content.

Preferably, the restricted-execution session enforces a security policy, wherein the security policy designates which user applications are allowed to run in the restricted-execution session.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods and systems for providing a secure e-mail messaging system using a vault server in conjunction with a client-side restricted-execution vault-mail environment. The principles and operation for providing such a secure e-mail messaging system, according to the present invention, may be better understood with reference to the accompanying description and the drawings.

Figure 1:
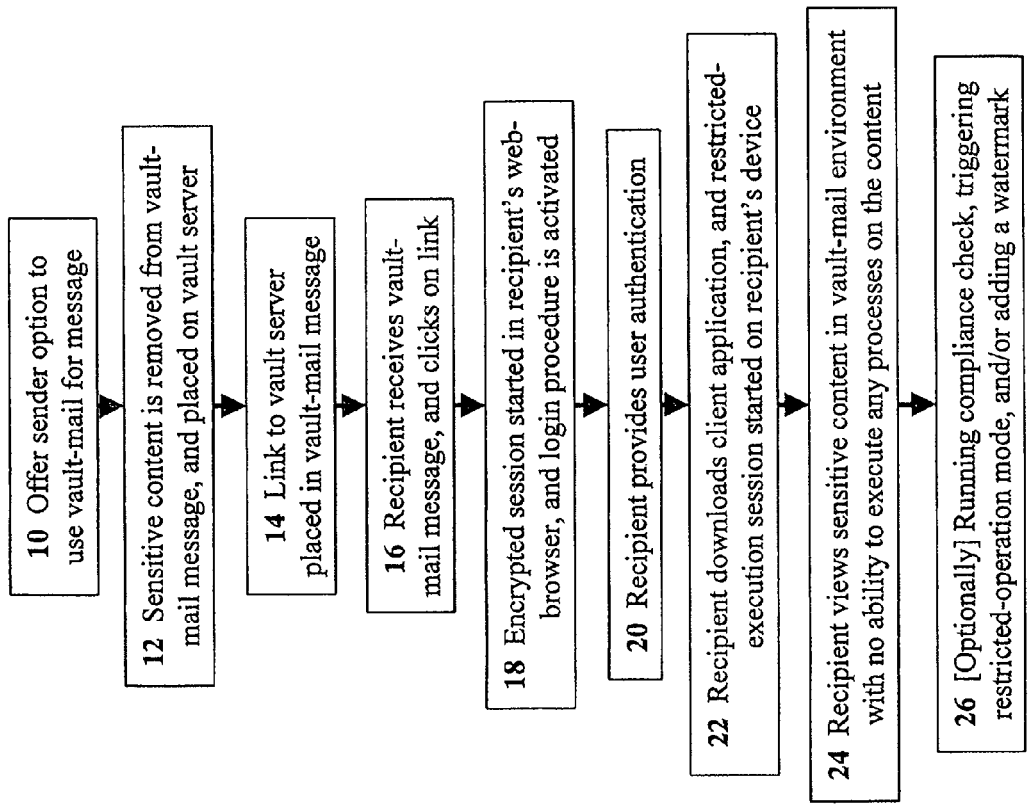
FIG. 1 is a simplified flowchart of the major process steps for a vault-mail messaging system, according to preferred embodiments of the present invention.

Referring now to the drawings, FIG. 1 is a simplified flowchart of the major process steps for a vault-mail messaging system, according to preferred embodiments of the present invention.

When an e-mail message that contains sensitive information is sent, the secure messaging system offers the sender the option to send the message as "vault mail" which uses a vault server to handle sensitive content (Step 10). The sensitive content (e.g. mail attachments) is removed from the e-mail, and placed on a designated vault server (Step 12). A link to the sensitive content in the vault server is placed in the vault-mail message (Step 14). When the recipient receives the vault-mail message, he/she can click on the link inside the message. After the recipient clicks on the link (Step 16), an encrypted session is started by the recipient's web-browser, and the recipient goes through a login procedure for authentication (Step 18).

After completing the login procedure (Step 20), the recipient downloads a client application that starts a restricted-execution session in the vault-mail environment on the recipient's device (Step 22). In the restricted-execution session of the vault-mail environment, it is not possible to copy, save, edit, print, forward, and/or save files or content using the recipient's device. Once the restricted-execution session has been activated, the recipient can view the sensitive content that was placed for him/her on the vault server using standard productivity software (e.g. word processors, presentation software, and image viewers) (Step 24). Such applications are executed within the restricted-execution session, which determines the list of allowed applications and limits their capabilities. Because the vault-mail environment does not permit the recipient to save, alter, or forward the sensitive content, the sender can be sure that content distribution remains under the sender's control. Because the recipient has been authenticated, and the sensitive content has been downloaded over an encrypted channel, the sender can be sure that the content is hidden from eavesdroppers and its integrity is intact.

Figure 2:
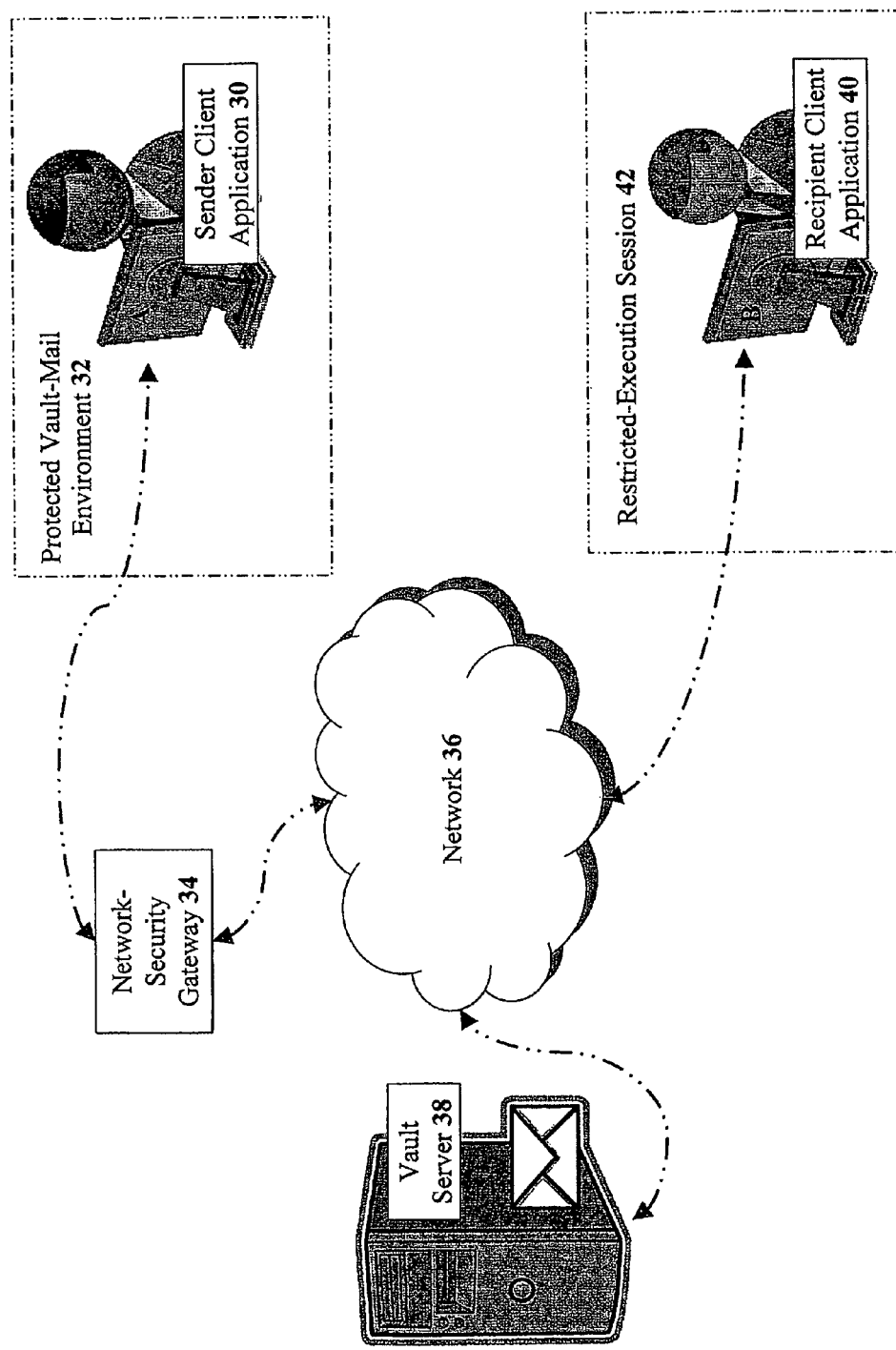
FIG. 2 is a simplified schematic block diagram of a vault-mail messaging system, according to preferred embodiments of the present invention.

FIG. 2 is a simplified schematic block diagram of a vault-mail messaging system, according to preferred embodiments of the present invention. A sender device A is used to send e-mail messages. The message is intercepted by a network-security gateway, which determines that it contains sensitive information. A sender client application 30 running on sender device A allows the sender to designate messages as vault mail (e.g. the sender is informed by return mail that the message being sent requires special treatment, and then uses a web application to confirm the use of vault mail).

Sender device A operates within a protected vault-mail environment 32. Sensitive content that is part of a vault-mail message is transmitted in an encrypted form from sender device A via a network-security gateway 34 over a network 34 (e.g. Internet, intranet, and LAN) to a vault server 38. Vault server 38 includes a memory and a processor (not shown in FIG. 2). The vault-mail message is sent to the recipient, and the message is received on a recipient device B. After due authentication, recipient device B downloads a recipient client application 40 which allows recipient device B to operate within a restricted-execution session 42. The recipient can then view the sensitive content (e.g. attachments) of the vault-mail message on vault server 38 using any standard productivity software.

While the invention has been described with respect to a limited number of embodiments, it will be appreciated that many variations, modifications, and other applications of the invention may be made.

What is claimed is:

1. A method for using a vault server in conjunction with a client-side restricted-execution vault-mail environment, the method comprising the steps of:
    (a) before sending, by a sender device, a vault-mail message containing sensitive content, removing said content from said vault-mail message;
    (b) placing said content on a vault server;
    (c) placing a link in said vault-mail message to said content on said vault server;
    (d) sending said vault-mail message, that lacks said content, to a designated recipient; and
    (e) upon clicking said link, by said designated recipient, allowing said content to be only viewed in a restricted-execution session of a client application, wherein said restricted-execution session does not allow said content to be altered, copied, stored, printed, forwarded, or otherwise executed.

2. The method of claim 1, wherein activation of said vault-mail message is performed by a network-security gateway.

3. The method of claim 1, wherein activation of said vault-mail message can be performed on a per-message basis.

4. The method of claim 1, wherein activation of said link requires user authentication.

5. The method of claim 4, wherein said user authentication may be designated during activation of said vault-mail message on a per-message basis based on said content.

6. The method of claim 1, wherein said restricted-execution session enforces a security policy, wherein said security policy designates which user applications are allowed to run in said restricted-execution session.

7. The method of claim 1, the method further comprising the step of:
    (f) prior to said step of allowing, performing a compliance check, by said client application, on a client system to verify that said client system does not contain a virus, said step of performing being optionally operative on a per-message basis based on said content.

8. The method of claim 1, the method further comprising the step of:
    (f) prior to said step of allowing, triggering a restricted-operation mode, by said client application, on a client system during said restricted-execution session, said step of triggering being optionally operative on a per-message basis based on said content.

9. The method of claim 1, the method further comprising the step of:
    (f) prior to said step of allowing, adding a watermark to said content, by said client application, wherein said watermark can be used to identify a content source of said content in case of a content leak, said step of adding being optionally operative on a per-message basis based on said content.

10. A non-transient computer-readable storage medium having computer-readable code embodied on the computer-readable storage medium, the computer-readable code comprising:
    (a) program code for, before sending, by a sender device, a vault-mail message containing sensitive content, removing said content from said vault-mail message;
    (b) program code for placing said content on a vault server;
    (c) program code for placing a link in said vault-mail message to said content on said vault server;
    (d) program code for sending said vault-mail message, that lacks said content, to a designated recipient; and
    (e) program code for, upon clicking said link, by said designated recipient, allowing said content to be only viewed in a restricted-execution session of a client application, wherein said restricted-execution session does not allow said content to be altered, copied, stored, printed, forwarded, or otherwise executed.

11. The storage medium of claim 10, wherein activation of said vault-mail message is performed by a network-security gateway.

12. The storage medium of claim 10, wherein activation of said vault-mail message can be performed on a per-message basis.

13. The storage medium of claim 10, wherein activation of said link requires user authentication.

14. The storage medium of claim 13, wherein said user authentication may be designated during activation of said vault-mail message on a per-message basis based on said content.

15. The storage medium of claim 10, wherein said restricted-execution session enforces a security policy, wherein said security policy designates which user applications are allowed to run in said restricted-execution session.

16. The storage medium of claim 10, the computer-readable code further comprising:
    (f) program code for, prior to said step of allowing, performing a compliance check, by said client application, on a client system to verify that said client system does not contain a virus, said step of performing being optionally operative on a per-message basis based on said content.

17. The storage medium of claim 10, the computer-readable code further comprising:
    (f) program code for, prior to said step of allowing, triggering a restricted-operation mode, by said client application, on a client system during said restricted-execution session, said step of triggering being optionally operative on a per-message basis based on said content.

18. The storage medium of claim 10, the computer-readable code further comprising:
    (f) program code for, prior to said step of allowing, adding a watermark to said content, by said client application, wherein said watermark can be used to identify a content source of said content in case of a content leak, said step of adding being optionally operative on a per-message basis based on said content.

19. A vault server for enabling a client-side restricted-execution vault-mail environment, the vault server comprising:
    (a) a memory for storing program code, wherein said program code includes program code for:
       (i) before sending, by a sender device, a vault-mail message residing in a client system containing sensitive content, removing said content from said vault-mail message;
       (ii) placing said content on the vault server;
       (iii) placing a link in said vault-mail message to said content on the vault server;
       (iv) sending said vault-mail message, that lacks said content, to a designated recipient; and
       (v) upon clicking said link, by said designated recipient, allowing said content to be only viewed in a restricted-execution session of a client application, wherein said restricted-execution session does not allow said content to be altered, copied, stored, printed, forwarded, or otherwise executed; and
    (b) a processor for executing said program code.

20. The vault server of claim 19, wherein activation of said vault-mail message is performed by a network-security gateway.

21. The vault server of claim 19, wherein activation of said vault-mail message can be performed on a per-message basis.

22. The vault server of claim 19, wherein activation of said link requires login credentials.

23. The vault server of claim 22, wherein said user authentication may be designated during activation of said vault-mail message on a per-message basis based on said content.

24. The vault server of claim 19, wherein said restricted-execution session enforces a security policy, wherein said security policy designates which user applications are allowed to run in said restricted-execution session.

25. The vault server of claim 19, wherein said memory further includes program code for:
    (vi) prior to said step of allowing, performing a compliance check, by said client application, on a client system to verify that said client system does not contain a virus, said step of performing being optionally operative on a per-message basis based on said content.

26. The vault server of claim 19, wherein said memory further includes program code for:
    (vi) prior to said step of allowing, triggering a restricted-operation mode, by said client application, on a client system during said restricted-execution session, said step of triggering being optionally operative on a per-message basis based on said content.

27. The vault server of claim 19, wherein said memory further includes program code for:
    (vi) prior to said step of allowing, adding a watermark to said content, by said client application, wherein said watermark can be used to identify a content source of said content in case of a content leak, said step of adding being optionally operative on a per-message basis based on said content.

\* \* \* \* \*